United States Patent

Arnemann et al.

[11] Patent Number: 5,381,996
[45] Date of Patent: Jan. 17, 1995

[54] VALVE OPERATOR

[75] Inventors: Scott Arnemann, Rolling Meadows; Scott Ferrar, Wheeling, both of Ill.

[73] Assignee: The E. H. Wachs Company, Wheeling, Ill.

[21] Appl. No.: 206,610

[22] Filed: Mar. 7, 1994

[51] Int. Cl.⁶ ............................................. F16K 31/12
[52] U.S. Cl. .................... 251/59; 251/129.12; 251/129.13; 251/248; 137/554
[58] Field of Search ............ 251/129.11, 129.12, 251/129.13, 59, 248; 137/554

[56] References Cited

U.S. PATENT DOCUMENTS

| | | | |
|---|---|---|---|
| 3,704,853 | 12/1972 | Waller | 251/59 |
| 4,621,789 | 11/1986 | Fukamachi | 251/129.11 |
| 4,687,179 | 8/1987 | Smith | 251/59 |
| 4,757,684 | 7/1988 | Wright | 251/59 |
| 5,101,862 | 4/1992 | Leete | 251/59 |
| 5,137,257 | 8/1992 | Tice | 251/129.12 |

Primary Examiner—A. Michael Chambers
Attorney, Agent, or Firm—Patnaude, Videbeck & Marsh

[57] ABSTRACT

A valve operating machine has a reversable motor and a drive assembly for turning the stem of a valve, and a sensor for determining the torque applied to the valve stem. The amount of torque applied to the valve stem is regulated so as not to exceed the torque limits of the valve. The machine will gradually apply greater amounts of torque in opposite directions until the valve has become unfrozen. Thereafter, the valve will be rotated until the opening or closing cycle has been completed. When an increase in torque is detected, the machine will reverse to unjam a valve, and where such reversal does not result in further forward movement, the machine will terminate the cycle.

13 Claims, 4 Drawing Sheets

VALVE OPERATOR

The present invention relates to machines which operate valves, and in particular machines to operate large valves of the type used for controlling the movement of water or petroleum through large pipes and across long distances.

BACKGROUND OF THE INVENTION

Municipalities and the like have extensive networks of piping to control the flow of water from storage and pumping stations to users. The network of piping includes numerous valves such that portions of the network can be closed off as needed for service while the remainder of the network remains in operation. The piping required for such networks can range from as small as three or four inches in diameter to as much as three feet in diameter. Also, the valves of the system typically remain in an open position or a closed position for very long periods of time. In a typical municipal water system, the valves are located below ground with an access shaft extending from the valve stem to the surface through which an elongate key is extended for turning the stem. Such valves typically include a screw rotated by the stem for opening and closing the valve, and the screw often requires 100 rotations of more to fully open or fully close the valve.

Underground valves are usually subjected to moisture and temperature changes, and the parts of the valve undergo certain deterioration over a Long period of time. Where a valve is infrequently operated, it typically becomes frozen, or locked into its current position as a result of the contamination and deterioration occurring in the valve.

Valve operating machines are provided which are generally mounted to a truck or the like and positioned over the shaft leading to a valve. Existing valve operating machines have a hydraulic motor to rotate an elongate key which extends to the stem of the valve. The motors of the machines are hydraulically operated and include sensors for determining the torque applied to the valve stem, and controls whereby a technician can increase or decrease the torque applied. To loosen a frozen valve without causing damage, the technician should apply torque in alternate directions until the valve loosens. When the technician knows whether the operator is to be rotated clockwise or counterclockwise, he will apply the greater amount of torque in the direction in which movement is desired. Once the valve has been broken free, a smaller amount of torque is required to move the valve, unless deposits within the valve become accumulated on the screw or other portions thereof and cause the valve to jam. Where the valve becomes jammed, the technician should turn the valve in the opposite direction for a short distance, typically one revolution, to loosen residue on the parts of the valve. After loosening the residue, the valve is again turned in the desired direction until the valve is either fully opened or fully closed. Existing valve operating machines include counters, and the technician may know that he has reached the opened or closed position for the valve by the number of revolutions that the valve has turned. In other cases, the technician does not know the number of revolutions required to open or close the valve. In such cases the valve will be turned until forward rotation has stopped, and reversing the valve will not result in further forward movement.

Existing valve operating machines are capable of applying a greater amount of torque to the stem of a valve than many valves are able to withstand. The maximum torque limits of each valve is known and an operator should never apply torque which exceeds the limit of the valve. A technician who is experienced, patient and careful, can operate a valve as described above without causing damage. Damage is caused to the valve, however, where a technician expects a valve to move in the wrong direction and applies an excessive amount of torque in the wrong direction. Damage can also occur to a valve when the valve becomes jammed and the technician causes an excessive torque to be applied to the stem rather than reversing the direction thereof as described above. It would, therefore, be desirable to provide a valve operating machine which would overcome the problem caused by impatient and careless technician. Specifically, it would be desirable to have machines which would loosen a frozen valve by gradually applying a greater amount of torque in opposite directions to the valve. It would also be desirable to provide a valve opener which would detect increases in torque requirements characteristic of jamming and automatically reverse the direction of rotation to thereby relieve jamming.

SUMMARY OF THE INVENTION

Briefly, the present invention is embodied in a portable valve operating machine designed to be moved from one valve to another for the purpose of turning the stem of a valve. The machine has a reversable motor and a drive means for turning the stem of a valve, and a sensor for determining the torque applied to the valve stem. The amount of torque applied to the valve stem is regulated by a control means. In accordance with the present invention, a computer is responsive to the torque measured by the sensor and operates the control means to apply a predetermined amount of torque to the valve in a first direction.

The computer will operate the control means to apply increasing amounts of torque to the stem of a valve in opposite directions until the valve has become unfrozen and begins to rotate. The computer will further operate the control means to then reduce the torque to the minimum required to rotate the valve. The computer will also limit the torque applied to the valve stem to less than the maximum limit of the valve which is provided to the computer prior to commencement of the exercise.

When the sensor determines that an increase in torque is required to rotate the valve, the computer will cause the control means to reverse the rotation for a short distance and then return to forward rotation. When reversing rotation does not result in further forward rotation of the valve, the computer will terminate further rotation.

The technician operating a machine in accordance with the present invention can thereby attach the machine to a stem of a valve, and the machine will gradually apply greater amounts of torque in opposite directions until the valve has become unfrozen. Thereafter, the valve will be rotated until the opening or closing cycle has been completed, or the valve has become jammed. When an increase in torque is detected, the machine of the present invention will reverse to unjam a valve, and where such reversal does not result in further forward movement, the machine will terminate the cycle. The valve operator of the present invention will, therefore, avoid damage to the valve by the application of excessive force during the operation thereof.

BRIEF DESCRIPTION OF THE DRAWINGS

A better understanding of the present invention will be had by a reading of the detailed description of the preferred embodiment taken in conjunction with the drawings wherein.

DETAILED DESCRIPTION OF A PREFERRED EMBODIMENT

Figure 1:
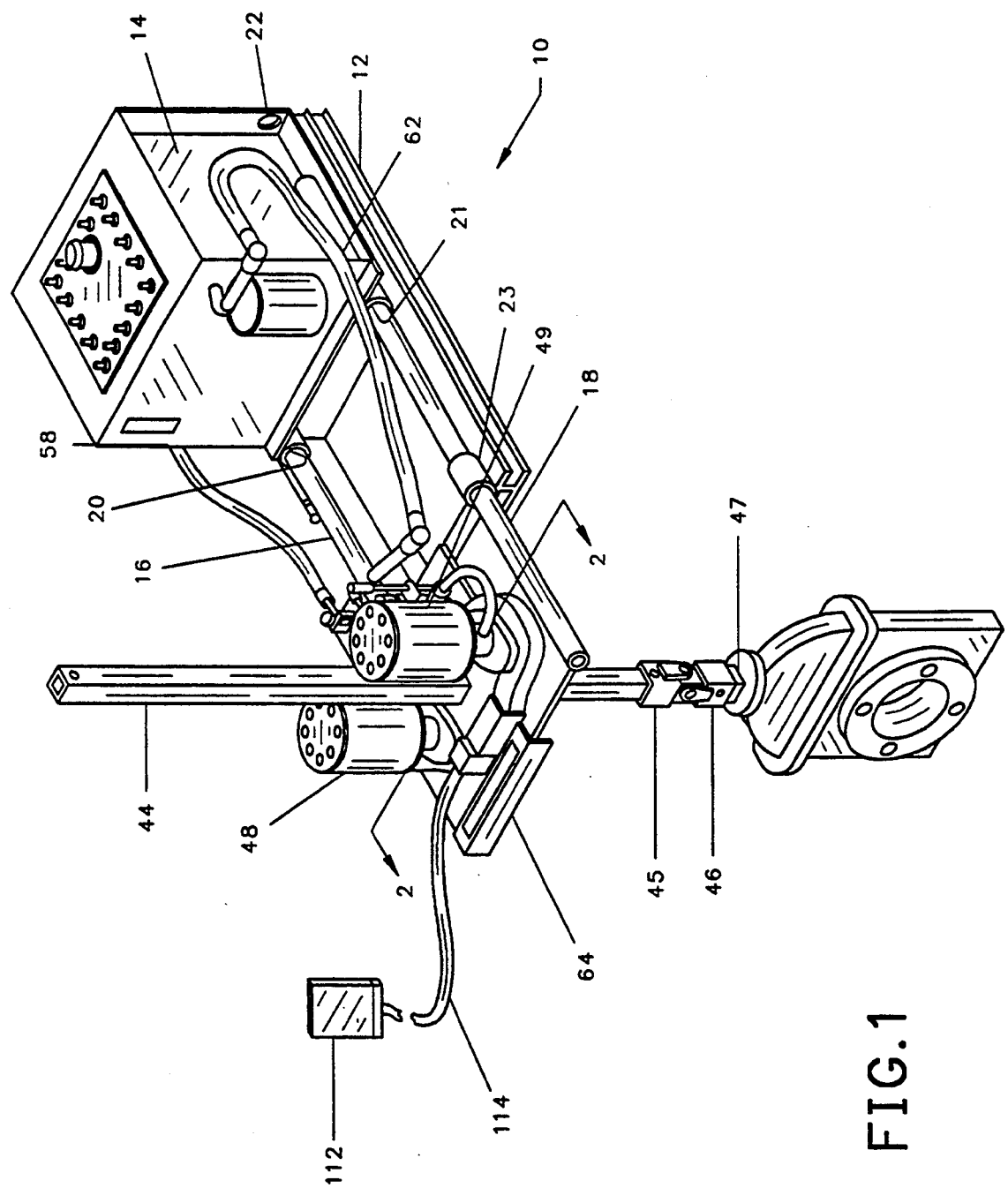
FIG. 1 is an isometric view of a valve operating machine in accordance with the present invention having a drive key attached to a valve.

Referring to FIG. 1, a valve operating machine 10 has a frame 12 suitable for mounting on the bed of a truck or the like. A reservoir 14 on the frame retains a quantity of hydraulic fluid which is pressurized by a power takeoff, not shown, attached to the transmission of the vehicle to which the valve operating machine 10 is mounted. A pair of tubular supports 16, 18 are longitudinally slidable through a plurality of cylindrical sleeves 20, 21, 22, 23, on the frame 12 and at the outer ends of the tubular supports 16, 18 is a table 24. The table 24 can be moved from a retracted position to an extended position by moving the supports 16, 18 outward through the sleeves 20, 21, 22, 23.

Figure 2:
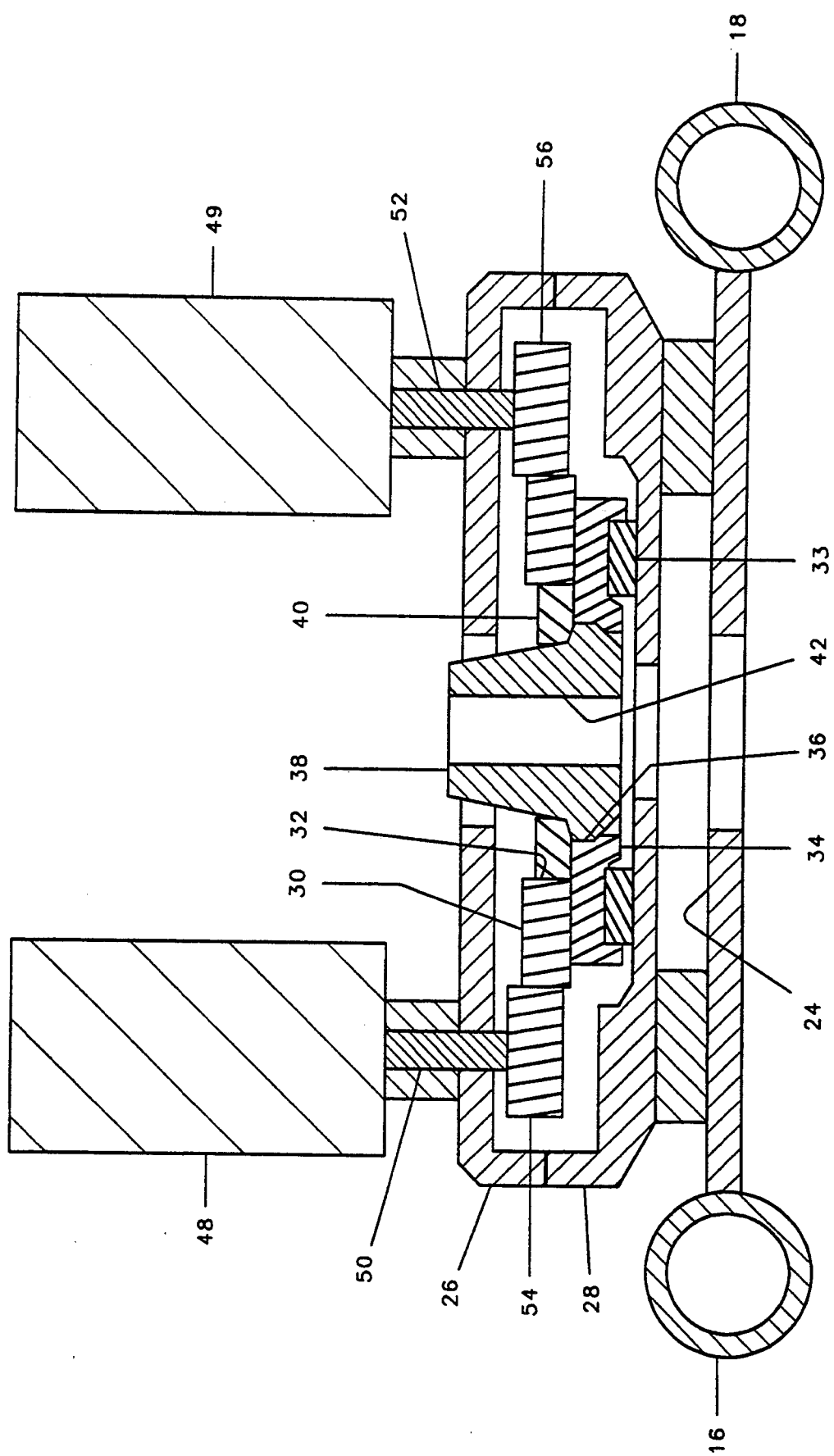
FIG. 2 is an enlarged cross-sectional view of the valve turner shown in FIG. 1 taken through lines 2—2 thereof.

Referring to FIG. 2, an upper and lower housing 26, 28, respectively, are secured to the upper surface of the table 24 and enclose a bull gear 30 having a centrally located hole 32 therethrough which rotates over a lubricated bushing 33. A hub 34 having a central opening therein is adapted to fit within the hole 32 of the bull gear 30 and receive within a central opening 36 therein a drive hub 38 which is retained to the hub 34 by an annular retaining ring 40. The drive hub 38 has a central aperture 42 therethrough having a rectangular cross-section for receiving an elongate drive key 44, having a complementary cross sectional shape. At the bottom of the key 44 is a universal joint 45, the lower portion of which has a socket 46 for receiving the stem of a valve 47. As best shown in FIG. 2, a pair of reversible hydraulic motors 48, 49 are mounted on opposite sides of the drive hub 38 on the upper surface of the upper housing 26, and each of the motors 48, 49 has a downwardly extending vertical shaft 50, 52 with a pinion gear 54, 56 at the lower end thereof engaged with the bull gear 30.

Figure 4:
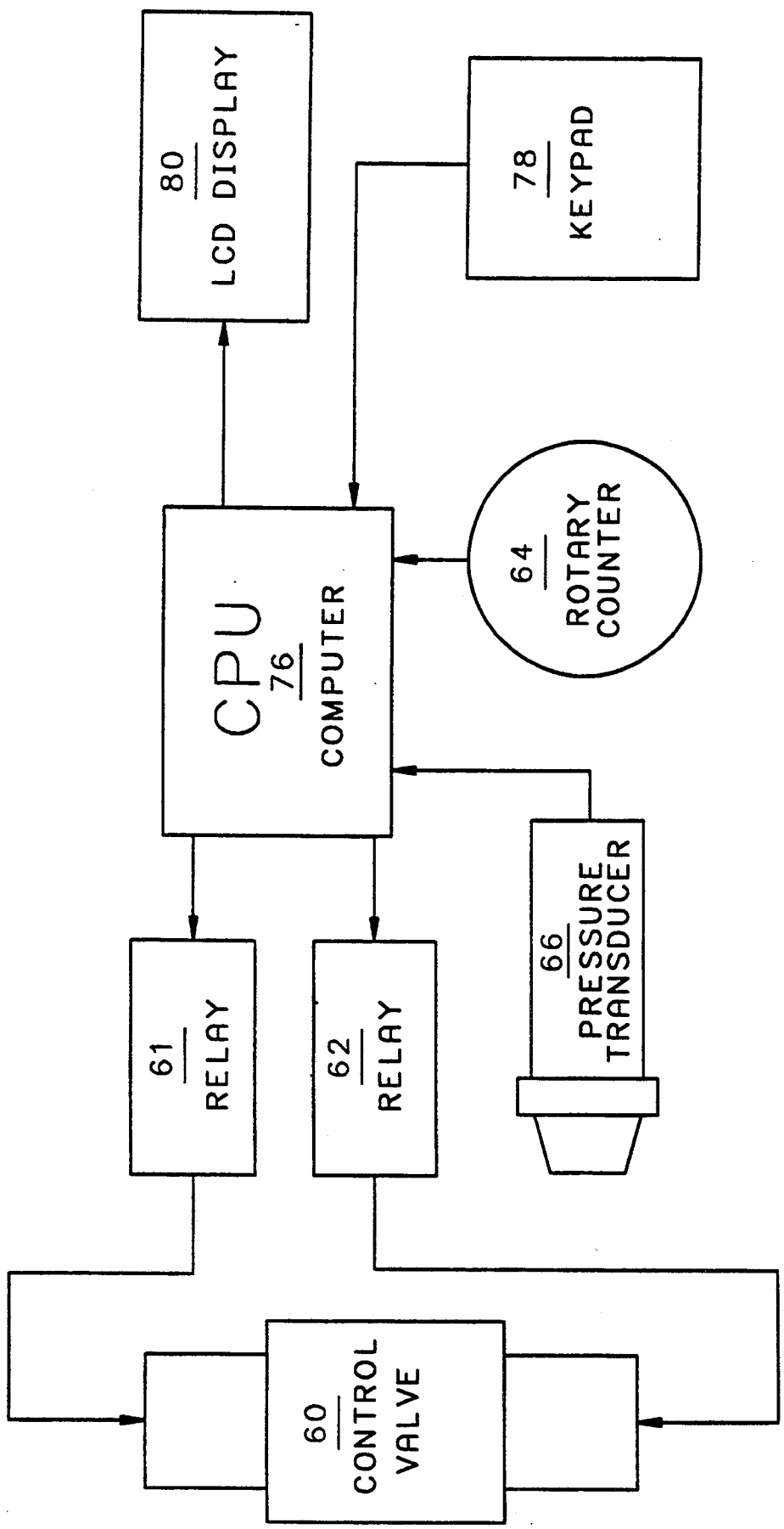
FIG. 4 is a schematic view of the circuit for the valve operator shown in FIG. 1.

Pressurized liquid from the power takeoff is carried by a flexible hose 58 to a solenoid operated control valve 60 which controls the flow of hydraulic fluid to each of the motors 48, 49. The control valve 60 is a control means for adjusting the pressure of hydraulic fluid to the motors 48, 49 and is of the type known in the art which can reverse the direction of the fluid directed to the motors 48, 49. As shown in FIG. 4, the control valve 60 is operated by a pair of solid state relays 61, 62 one of which directs pressurized fluid through the motors in one direction and the other of which directs pressurized fluid through the motors in the opposite direction to thereby reverse the direction of the motor. A return hose 62 connected to the opposite side of the solenoid valve 60 returns low pressure hydraulic fluid to the reservoir 14.

As shown in FIGS. 1 and 4, the machine further includes a rotary counter 64 which produces an electric signal for each rotation of the bull gear 30 and the drive key 44 to record the number of turns and the direction of rotation. Also, a pressure transducer 66 connected to the control valve 60 reads the pressure of hydraulic fluid in the motors 48, 49 and, therefore, the torque being applied by the motors to the bull gear 30 and the drive key 44.

Figure 3:
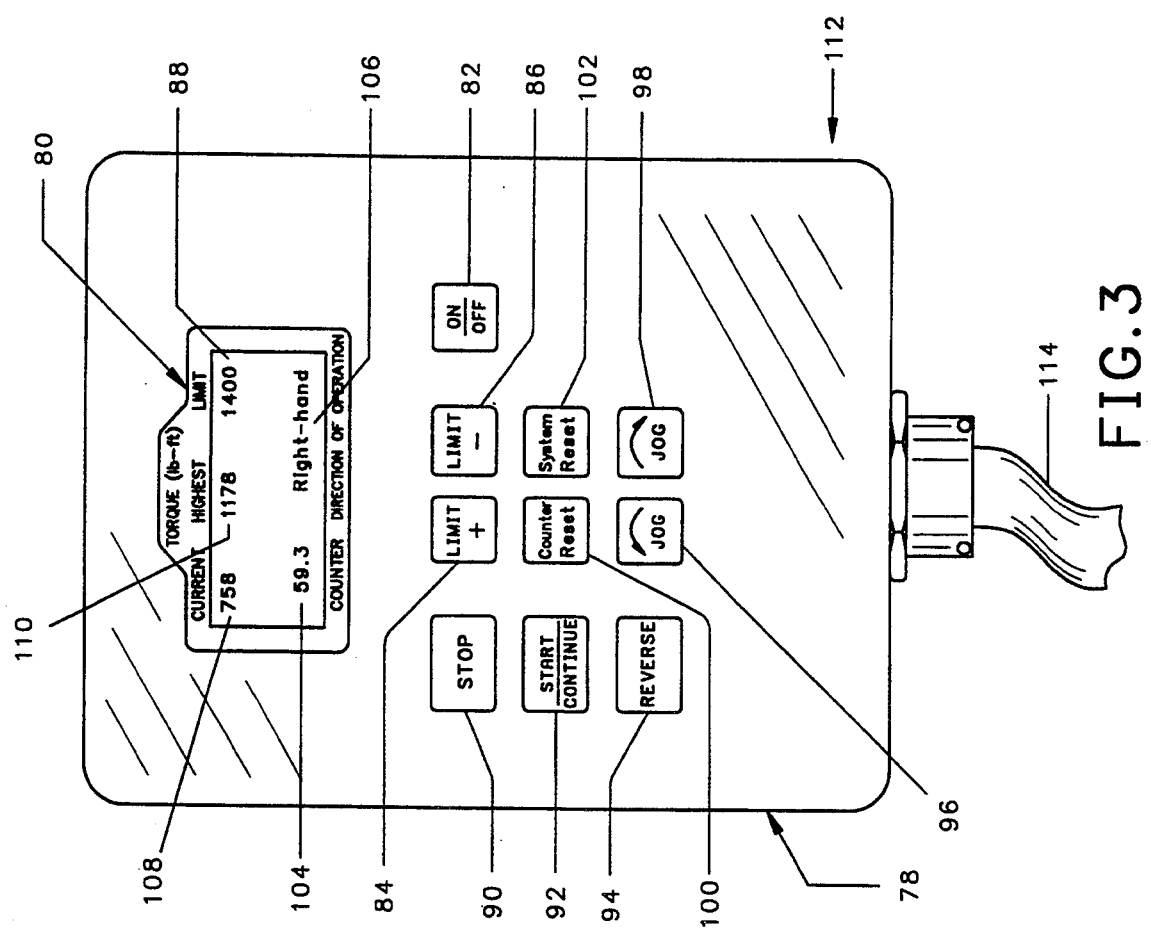
FIG. 3 is an enlarged front elevational view of a readout control panel of the present invention.

Referring to FIGS. 3 and 4, the present invention, includes a computer 76, a keypad 78 for inputting information to the computer 76, and an LCD display 80. The computer 76 also receives input from the pressure transducer 66 and the rotary counter 64.

The keypad 78 has an on-off key 82 for commencing or terminating an exercise of the machine and a number of other keys for the technician to input instructions to the computer. The computer requires that the operator first insert a torque limit of the valve to be operated, and this information is inserted by depressing either a limit plus key 84 or a limit minus key 86 to raise or lower a torque limit of a valve as shown at 88 on the display unit 80. If, for any reason, the technician does not insert a torque limit, the computer is programmed to insert a default torque limit of two hundred foot pounds at the commencement of a new exercise, which is within the torque limits of even a small valve. The keypad further includes a stop button 90 which terminates the application of torque to the bull gear 30 and the valve stem 47 and a start/continue key 90 which commences an exercise, or restarts a temporarily discontinued exercise. There is also a reverse key 94 for reversing the direction of rotation of the drive key 44 and stem 47 and jog keys 96, 98 to impart a slight rotation of the drive head in either the clockwise or counterclockwise direction, respectively, to facilitate the attachment and detachment of the socket 46 over the stem 47. Finally, the key pad 78 also has a counter reset key 100 for resetting the counter to zero, and a system reset key 102 for terminating an exercise and commencing a new exercise.

The display unit 80 includes a readout for the number of turns 104 that the bull gear, key, and valve stem have rotated, and the direction of rotation 106 which is information received from the rotary counter 64. The display 80 further provides a readout of the torque currently applied to the valve 108 which is received from the transducer 66 and a readout of the highest torque applied to the valve during the exercise 110. The computer 76, the display unit 80 and the key pad 78 are fitted into an enclosure 112 which is connected to the machine 10 by a cable 114.

To operate the present invention, a vehicle having the valve operating machine 10 mounted thereon is positioned near a valve and the mounting table 24 is moved to the extended position outward of the vehicle and above the valve stem 47. The key 44 is then positioned within the drive hub 38 and the power take off from the vehicle engaged to direct hydraulic fluid to the valve operating machine 10. The technician will next depress the on/off key 82 to turn on the computer and then press one of the limit keys 84, 86 to set the maximum torque of the valve shown at 88. If the socket 46 cannot be fitted over the stem 47, the technician can depress the jog left or jog right keys 96, 98 until the socket 47 is seated upon the stem. Upon depressing the start key 92, the computer will commence directing fluid through the control valve 60 to the motors 48, 49 to apply torque in opposite directions to the stem 47. Initially, a relatively low torque is applied and gradually the torque is increased until the limits of the valve had been reached. Prior to reaching the torque limits of the valve, the valve should commence rotating in either a right-hand or a left-hand direction. During the operation of the exercise, the highest torque applied to the valve will be displayed on the readout unit 80 at 110, and the current torque being applied to the stem will be shown on the readout at 108. The number of turns that the valve rotates as determined by the counter 64 will be shown on the display unit at 104.

Once the valve commences rotating, the computer will reduce the torque applied to the valve to the minimum torque required to continue rotation thereof. Should the valve require a substantial increase in torque to continue rotating, the computer will reverse the rotation of the valve for a single revolution to permit the valve to become unjammed. Thereafter, the computer will again reverse the direction of the motors 48, 49, and the rotation of the stem 47. If the torque requirements again increase at the same location that the valve was previously stopped, the machine will terminate all movement until further instructions are inputted by the operator. The operator can then determine whether the valve has reached the fully opened or fully closed position, or alternately, that the exercise should continue. If the technician decides that the exercise should continue, the start/continue key 100 is depressed, and the machine will again apply torque to the stem 47 of the valve. Once the valve has reached its fully opened or fully closed position, it will stop rotating and the computer will terminate the application of torque to the stem 47. To disconnect the machine from the valve stem, the operator may again depress one or both of the jog keys 96, 98 to loosen the socket 46 and remove the drive key 44. Finally, the on/off key 82 can again be depressed and the machine turned off.

While the present invention has been described in connection with one embodiment, it will be understood by those skilled in the art that many changes and modifications may be made without departing from the true spirit and scope of the present invention. Therefore, it is intended by the appended claims to cover all such changes and modifications which come within the true spirit and scope of the present invention.

What is claimed:

1. A valve operating machine comprising in combination:
   drive means for turning the stem of a valve;
   means for connecting and disconnecting said drive means to the stem of a first valve or a second valve;
   motor means for rotating said drive means;
   control means for controlling the application of torque by said motor means to said drive means;
   first sensor means for measuring torque applied by said motor means to said drive means; and
   computer means responsive to said first sensor means for controlling said control means to limit the application of torque to the valve stem of the connected valve such that the torque applied to the connected valve is limited to a predetermined value.

2. A valve operating machine in accordance with claim 1 further comprising reverse means for reversing the direction of said drive means; and said reversing means responsive to said computer means for reversing said drive means.

3. A valve operating machine in accordance with claim 2 wherein said computer further includes means for directing said control means to apply a predetermined torque to a non-rotating valve stem in a first direction, and then to apply said predetermined torque to said valve in a second direction.

4. A valve operating machine in accordance with claim 1 wherein said computer further includes means for reversing the direction of rotation for a short angular distance in response to said sensor means detecting of a first increased application of torque, and after said reversal for said short angular distance, returning to rotation in said first direction.

5. A valve operating machine in accordance with claim 4 wherein said computer further includes means for terminating further rotation upon said sensor means detecting a second increased application of torque at the same angular position of rotation as said first increased application of torque.

6. The valve operating machine in accordance with claim 1 further comprising
   second sensor means for sensing the rotation of said drive means in a first direction, and
   said computer means responsive to said second sensor means.

7. The valve operating machine in accordance with claim 1 further comprising:
   second sensor means for sensing rotation of said drive means in a first direction and in a second direction, and
   said computer means responsive to said second sensor means.

8. The valve operating machine in accordance with claim 1 wherein said computer means includes memory means and feedback means for retaining and recalling operating characteristics of a given valve.

9. The valve operating machine in accordance with claim 1 and further comprising readout means for displaying information to an operating technician.

10. The valve operating machine in accordance with claim 1 and further comprising a key pad for inserting instructions into said computer means.

11. The valve operating machine in accordance with claim 1 wherein said predetermined value of torque applied in a first direction is a varying precalculated torque value.

12. A valve operating machine comprising in combination:
    drive means for turning the stem of a valve;
    means for connecting and disconnecting said drive means to the stem of a first valve or a second valve;
    motor means for rotating said drive means;
    sensor means for measuring the rotation of said drive means;
    control means for controlling said motor means to rotate a stem of a connected valve in a first direction, and
    computer means responsive to said sensor means for directing said control means to rotate a stem of a connected valve a predetermined angular distance in said first direction.

13. A valve operating machine in accordance with claim 12 wherein said computer means records the direction of rotation of said drive means.

* * * * *